(12) United States Patent
Denio et al.

(10) Patent No.: US 9,015,376 B2
(45) Date of Patent: Apr. 21, 2015

(54) METHOD FOR INFRASTRUCTURE MESSAGING

(75) Inventors: Michael A. Denio, Allen, TX (US);
Brian Karguth, Van Alstyne, TX (US);
Akila Subramaniam, Dallas, TX (US);
Charles Fuoco, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 215 days.

(21) Appl. No.: 13/459,212

(22) Filed: Apr. 29, 2012

(65) Prior Publication Data

US 2013/0290984 A1    Oct. 31, 2013

(51) Int. Cl.
*G06F 3/00* (2006.01)
*G06F 15/16* (2006.01)
*G06F 9/54* (2006.01)

(52) U.S. Cl.
CPC .......... *G06F 9/546* (2013.01); *G06F 2209/548* (2013.01)

(58) Field of Classification Search
CPC ........ H04L 47/10; H04L 49/90; G06F 15/173
See application file for complete search history.

(56) References Cited

U.S. PATENT DOCUMENTS 7,007,099 B1 *   2/2006   Donati et al. ................. 709/237

\* cited by examiner

*Primary Examiner* — Hyun Nam
(74) *Attorney, Agent, or Firm* — Robert D. Marshall, Jr.; Frank D. Cimino

(57) ABSTRACT

A low overhead method to handle inter process and peer to peer communication. A queue manager is used to create a list of messages with minimal configuration overhead. A hardware queue can be connected to another software task owned by the same core or a different processor core, or connected to a hardware DMA peripheral. There is no limitation on how many messages can be queued between the producer and consumer cores. The low latency interrupt generation to the processor cores is handled by an accumulator inside the QMSS which can be configured to generate interrupts based on a programmable threshold of descriptors in a queue. The accumulator thus removes the polling overhead from software and boosts performance by doing the descriptor pops and message transfer in the background.

12 Claims, 4 Drawing Sheets

REGISTER D

| BIT | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| FIELD | desc_ptr ||||||||||||||||||||||||||||| desc_info ||||
| RESET | 0 ||||||||||||||||||||||||||||| 0 ||||
| TYPE | rw ||||||||||||||||||||||||||||| rw ||||

| FIELD | NAME | DESCRIPTION |
|---|---|---|
| 31:4 | desc_ptr | DESCRIPTOR POINTER. IT WILL BE READ AS ZERO IF THE QUEUE IS EMPTY. IT WILL INDICATE A 16-BYTE ALIGNED ADDRESS THAT POINTS TO A DESCRIPTOR WHEN THE QUEUE IS NOT EMPTY. |
| 3:0 | desc_info | A GENERIC VALUE THAT IS PRESERVED DURING THE PUSH/POP CYCLE THROUGH THE QUEUE MANAGER. THIS FIELD WILL RETURN A 0x0 WHEN AN EMPTY QUEUE IS READ. |

REGISTER A

| BIT | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| FIELD | rsvd | | | | | | | | | | | | | queue_entry_count | | | | | | | | | | | | | | | | | | |
| RESET | 0 | | | | | | | | | | | | | 0 | | | | | | | | | | | | | | | | | | |
| TYPE | r | | | | | | | | | | | | | r | | | | | | | | | | | | | | | | | | |

| FIELD | NAME | DESCRIPTION |
|---|---|---|
| 18:0 | queue_entry_count | THIS FIELD INDICATES HOW MANY PACKETS ARE CURRENTLY QUEUED ON THE QUEUE. THIS COUNT IS INCREMENTED BY 1 WHENEVER A PACKET IS ADDED TO THE QUEUE. THIS COUNT IS DECREMENTED BY 1 WHENEVER A PACKET IS POPPED FROM THE QUEUE. |

*FIG. 2*

REGISTER B

| BIT | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| FIELD | queue_byte_count | | | | | | | | | | | | | | | | | | | | | | | | | | | | | | | |
| RESET | 0 | | | | | | | | | | | | | | | | | | | | | | | | | | | | | | | |
| TYPE | r | | | | | | | | | | | | | | | | | | | | | | | | | | | | | | | |

| FIELD | NAME | DESCRIPTION |
|---|---|---|
| 31:0 | queue_byte_count | THIS FIELD INDICATES HOW MANY BYTES TOTAL ARE CONTAINED IN ALL OF THE PACKETS WHICH ARE CURRENTLY QUEUED ON THIS QUEUE. |

*FIG. 3*

REGISTER C

| BIT | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| FIELD | head_tail | rsvd | | | | | | | | | | | | | | packet_size | | | | | | | | | | | | | | | | |
| RESET | 0 | 0 | | | | | | | | | | | | | | 0 | | | | | | | | | | | | | | | | |
| TYPE | w | R | | | | | | | | | | | | | | rw | | | | | | | | | | | | | | | | |

| FIELD | NAME | DESCRIPTION |
|---|---|---|
| 31 | head_tail | HEAD/TAIL PUSH CONTROL. SET TO ZERO IN ORDER TO PUSH PACKET ONTO TAIL OF QUEUE AND SET TO ONE IN ORDER TO PUSH PACKET ONTO HEAD OF QUEUE. |
| 16:0 | packet_size | THIS FIELD INDICATES PACKET SIZE AND IS ASSUMED TO BE ZERO ON EACH PACKET ADD UNLESS THE VALUE IS EXPLICITLY OVERWRITTEN. THIS FIELD INDICATES PACKET SIZE FOR PACKET POP OPERATION. |

FIG. 4

REGISTER D

| BIT | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| FIELD | desc_ptr | | | | | | | | | | | | | | | | | | | | | | | | | | | | desc_info | | | |
| RESET | 0 | | | | | | | | | | | | | | | | | | | | | | | | | | | | 0 | | | |
| TYPE | rw | | | | | | | | | | | | | | | | | | | | | | | | | | | | rw | | | |

| FIELD | NAME | DESCRIPTION |
|---|---|---|
| 31:4 | desc_ptr | DESCRIPTOR POINTER. IT WILL BE READ AS ZERO IF THE QUEUE IS EMPTY. IT WILL INDICATE A 16-BYTE ALIGNED ADDRESS THAT POINTS TO A DESCRIPTOR WHEN THE QUEUE IS NOT EMPTY. |
| 3:0 | desc_info | A GENERIC VALUE THAT IS PRESERVED DURING THE PUSH/POP CYCLE THROUGH THE QUEUE MANAGER. THIS FIELD WILL RETURN A 0x0 WHEN AN EMPTY QUEUE IS READ. |

*FIG. 5*

METHOD FOR INFRASTRUCTURE MESSAGING

TECHNICAL FIELD OF THE INVENTION

The technical field of this invention is high speed interprocessor messaging.

BACKGROUND OF THE INVENTION

In complex multicore System on a Chip (SOC) devices it is important to have a low latency, high throughput messaging system for Inter Processor Communication (IPC) and peer to peer (P2P) communication with very low overhead. Historically, communications have been implemented in a variety of fashions, but without uniformity, with each requiring specific hardware architectures. Two common examples include shared memory or hardware mailboxes.

Shared memory solutions have to deal with coherency issues when one core is attempting to consume data produced by another producer (core). Any coherence operation consumes processing power and adds latency. Most mechanisms also rely on synchronization methods implemented in software such as a semaphore to gate access to shared memory that adds performance penalty. In addition, shared memory is inherently unsecure and susceptible to accidental or intentional corruption.

Direct message passing models provide direct communication between two processor cores using some form of hardware or software "mailbox" that fit a specific need, but and are not flexible for a broader application (such as peer to peer messaging).

SUMMARY OF THE INVENTION

The invention described uses a hardware component such as the Queue Manager Subsystem (QMSS) which includes a DMA controller, queue manager, accumulator and software to accomplish the following:

Zero copy, low latency Inter-processor communication: This is achieved by a core (producer) creating message data and attaching it to a descriptor or directly loading the message data onto the descriptor and pushing it to a hardware queue. A descriptor is a data element managed by the queue manager. Attaching the message data to a descriptor provides no alignment or message buffer size restrictions. The low overhead, low latency notification to the consumer core is achieved by an accumulator which polls the queues in the background, pops the list of descriptor pointers to the messages and interrupts the consumer core.

Peer to peer messaging with zero intervention by the host is achieved by pushing messages or application data to a hardware queue that is attached to another DMA peripheral. This automatically chains transfers from one DMA entity to another or from a software task to a DMA entity. Since notification to the DMA peripheral is done through a hardware queue pend signal, it completely eliminates any software intervention by the host and allows seamless peer to peer communication.

BRIEF DESCRIPTION OF THE DRAWINGS

These and other aspects of this invention are illustrated in the drawings, in which:

FIG. 2 illustrates Register A;

FIG. 3 illustrates Register B;

FIG. 4 illustrates Register C, and

FIG. 5 illustrated Register D.

DETAILED DESCRIPTION OF PREFERRED EMBODIMENTS

Figure 1:
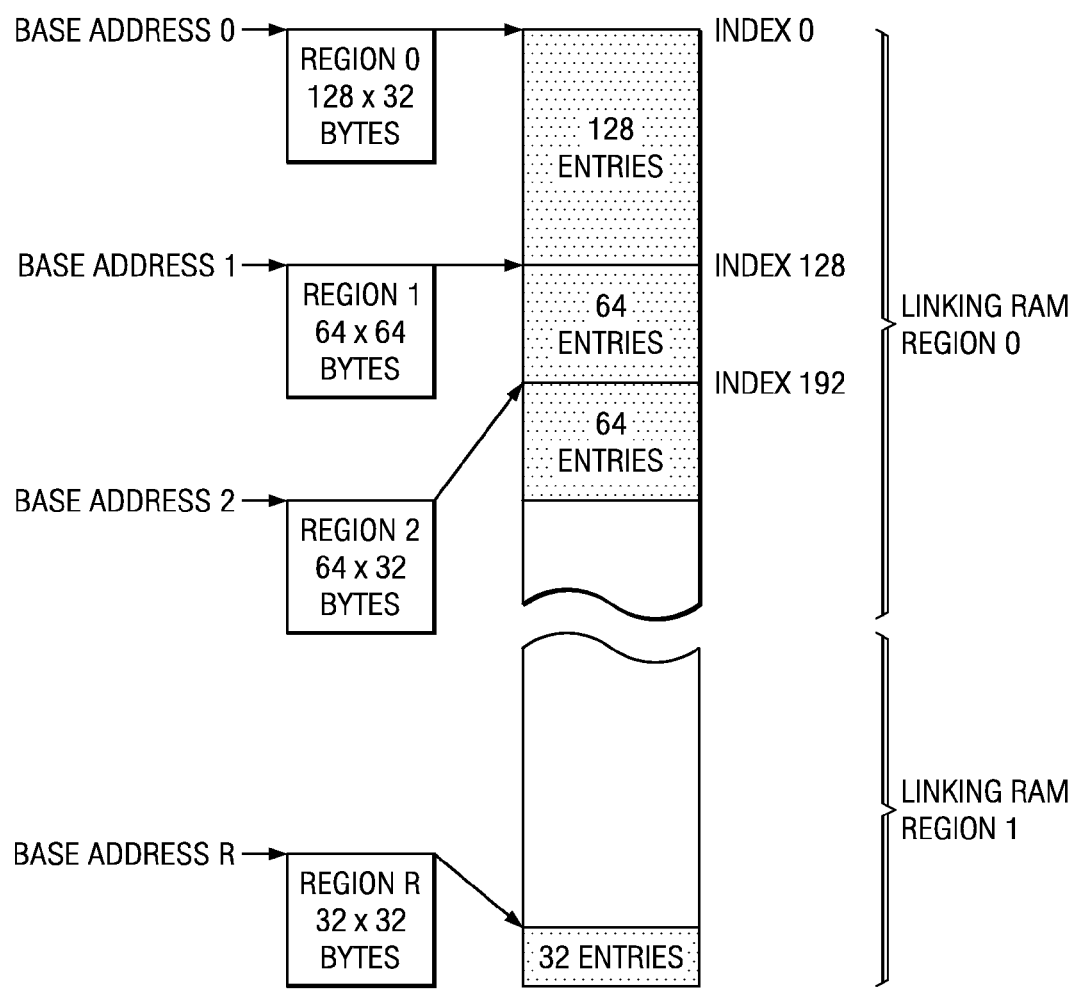
FIG. 1 shows the relationship between memory regions and the linking ram.

Existing message passing mechanisms are either processor architecture or interconnect topology dependent or strictly intended for inter processor communication (IPC) and not flexible to apply to a wider application such as peer to peer messaging.

This invention is based on hardware messaging components with significant software flexibility that not only facilitate a low overhead inter processor communication but also peer to peer communication with zero software intervention. The solution is also processor architecture or interconnect topology agnostic and scalable to handle any number of processor cores and hardware queues.

Communications appear uniform to the sender and receiver regardless of whether the message is sent via shared memory, copied across memory regions in the same subsystem, copied across subsystems, or even copied across a chip interconnect bus. The message transport is transparent to the user application.

The benefit of the described messaging solution is that it is a low overhead method to handle not only IPC but also peer to peer communication. The queue manager hardware component is used to create the list of messages with minimal configuration overhead. A hardware queue can be connected to another software task owned by the same core or different processor core, or connected to a hardware DMA peripheral. The described QMSS can be easily scaled to handle more processor cores, hardware queues and descriptors. The queue manager offers software flexibility in mapping the descriptors to any address range, allowing multiple memory regions for mapping different descriptor sizes, allowing queuing to the head or tail of the linked list.

There is no limitation on how many messages can be queued between the producer and consumer cores. There is also no restriction on how messages can be queued between 2 processor cores, a software task to a DMA peripheral or between 2 DMA peripherals (peer to peer).

The low latency interrupt generation to the processor cores is handled by the accumulator inside the QMSS which can be configured to generate interrupts based on a programmable threshold of descriptors in a queue, and pop queues into small lists for bulk processing by software. The accumulator thus removes the polling overhead from software and boosts performance by doing the descriptor pops and message transfer in the background.

The accumulate unit is a firmware driven functionality that operates in conjunction with the Interrupt Distributor (INTD) and a timer to monitor 512 queues and generate interrupts upon occurrence of queue events.

The Queue pending status for 512 queues is presented to the accumulator 32 bits at a time, with each bit representing a group of 32 queues. These groups of queues are scanned in round robin fashion at each timer tick. For the queues that have pending descriptor pointers, the descriptor pointers are read from the queue manager and written to a host accessible memory area. The QMSS also ensures that the writes have actually completed before it generates any interrupts. This is necessary to avoid race conditions in which the CPU that receives the interrupt does not see the data from before the writes have completed.

The accumulator generates interrupts in two situations. First is if the number of pointers in a queue is greater than a programmed threshold. Second is when it has been longer than a programmed period of time since the last interrupt and there is at least one pointer pending. Each queue group has its own settings of the timer interval and of the threshold number of queues that triggers the generation of interrupt. All interrupts are generated through writes to the software interrupt registers.

In addition to monitoring the queue groups, the accumulator also monitors an additional 32 queues with a higher priority level. Each of these high priority queues has its own dedicated interrupt. These queues are polled after every group of queues is polled and thereby provides an order of magnitude better performance. These queues can be assigned to the processes that need much lower latency for the interrupt to be generated after a queue event. Note that the observed latency will depend upon the access latencies seen by the accumulator while writing pointers to a memory region outside of QMSS.

The descriptors are stored in memory regions that are configured by the host software. The host allocates multiple memory regions where descriptors of various sizes are stored.

stores information for one descriptor index. For example, in a queue, a descriptor index X with descriptor index Y next to it will have an entry in linking RAM location X that has a value Y. The linking information for all descriptors in a given memory region is stored in a contiguous fashion in the linking RAM. The queue manager supports linking RAM to be located in two regions and it can be configured to use one or both linking RAM regions. Two linking RAM regions are supported so that part of the linking RAM can be located on-chip and part off-chip.

FIG. 1 illustrates the relationship between memory regions and the linking RAM. When the Queue Manager computes descriptor addresses/indexes, it takes into account the base address of a region as well as the size and number of descriptors that are stored in the region. The descriptor pointers that are pushed must have an address that matches the computed address based upon region base address, region index and descriptor size programmed in the region control registers. Any mismatch in addresses will lead to corruption in queue manager's data structures.

Descriptors are queued onto a logical queue by writing a burst of information to the corresponding Queue N Registers as shown in Table 1.

TABLE 1

| Offset | Name | Description |
|---|---|---|
| 0x00000000 + 16xN | Queue N Register A | The Queue N Register A is an optional register that is only implemented for a queue if the queue supports entry/byte count feature. The entry count feature provides a count of the number of entries that are currently valid in the queue. It does not support byte accesses. |
| 0x00000000 + 16xN + 4 | Queue N Register B | The Queue N Register B is an optional register that is only implemented for a queue if the queue supports a total byte count feature. The total byte count feature provides a count of the total number of bytes in all of the packets that are currently valid in the queue. This register must be read prior to reading Queue N register D during packet pop operation if the total size information is desired. It does not support byte accesses. |
| 0x00000000 + 16xN + 8 | Queue N Register C | The Queue N Register C is used to provide additional information about the packet that is being pushed or popped from the queue. This register provides an option for the packet to be pushed onto either the tail of the queue (default) or the head of the queue (override). This register must be written prior to writing the Queue N register D during packet write operations. This register must be read prior to reading Queue N register D during pop operations if the packet size information is desired. It does not support byte accesses. |
| 0x00000000 + 16xN + C | Queue N Register D | The Queue N Register D is written to add a packet to the queue and read to pop a packets off a queue. The packet is only pushed or popped to/from the queue when the Queue Register D is written. It does not support byte accesses. |

Each memory region has descriptors of one configurable size and each memory region can accommodate a programmable number of descriptors. These descriptors are referenced internally in the queue manager by an index (a number between zero and the total number of descriptors minus 1). The host, when it initializes the memory regions, also writes the index number corresponding to the first descriptor in a given region. This information is used by the queue manager to compute where exactly in memory is a particular descriptor stored.

The queue manager uses a linking RAM to store information about how the descriptors are logically connected to one another in various queues. Each location in the linking RAM Registers A through D are further illustrated in FIGS. 2, 3, 4 and 5.

This burst contains optional control information, an optional descriptor size, and a required pointer to the descriptor that is being added. The control and packet size information (if present) is written to Register C of the Nth Queue. The descriptor pointer is written to Register D of the Nth Queue. A write to the Register D of queue N causes the queue manager to add the descriptor either onto the head or the tail of the queue as specified in the Packet Queue N Register C.

The queue manager tracks the descriptors in a queue by the descriptor index. The descriptor index is a serial number given to each descriptor that is managed by the queue manager. It ranges from zero to one less than the total number of descriptors. To queue a descriptor, the queue manager first resolves the 32-bit descriptor pointer into its descriptor index. Once the physical index information is determined, the queue manager links that descriptor onto the descriptor chain that is maintained for that logical queue by writing the linking information out to a linking RAM. The linking RAM is external to the queue manager. The queue manager also updates the queue head and tail pointers. Since logical queues within the queue manager are maintained using linked lists, queues cannot become full and no check for fullness is required before a packet descriptor is queued.

The queue manager also tracks the information pushed in the four Least Significant Bits (LSB) of register D. It keeps note of the value provided in these bits with each push operation and presents the value back at the time of pop operation in the four LSBs of the descriptor pointer. These bits can be used for preserving a generic 4-bit value during the traversal of a descriptor pointer through the Queue Manager. The Queue Manager only preserves this information and does nothing else with it.

The queue manager allows writing more than one 32-bit word during the queue operation. The queue manager starts a new queue operation when register A, B or C is written and ends its when register D is written. If these registers are written in individual bus transactions, it is not possible to ensure that no more than one bus master is writing to these registers at a time. Therefore, it is important that the bus masters initiate a write transaction that atomically writes to these registers. In other words, the master should use a burst write to queue a descriptor pointer. The burst access should start at the address of Register A, B, C or D and always ends at Register D. A burst that terminates at an address other than that of Register D will result in unspecified behavior. Note that writing to registers A and B is permitted but has no useful purpose for queuing operations. The registers A and B still exist because they are used in the dequeue operation. All queue operations are recommended to be bursts that start at register C or D and terminate at register D.

Note that if a CPU is initiating a queue operation, the CPU must be capable of doing a store operation of 32 or 64 bits to ensure that the write is delivered as a single burst of two 32-bit writes on the Queue Manager interface. If the entity performing the queue operation does not have the ability to do a burst write or cannot guarantee that a 64-bit store will result in a burst write cycle, it should use the queue proxy module that is a part of the QMSS infrastructure. The queue proxy is not required if only register D is accessed for all queue operations. If register C and D are both accessed, then the queue proxy is not required only if the CPU is able to perform a store of 64 bit value in single instruction.

Descriptors are de-queued from a logical queue by reading a descriptor pointer value from the corresponding Queue N Register D. When the Queue N Register D is read and if it is not empty, it will return the 32-bit descriptor pointer that is on the head of the queue. If the queue is empty it will return a value of 0x0. If other information is desired it should be read from registers A-C in the same burst in which the Queue N Register D is read.

Since dequeuing an entry from the head of a queue requires access to the internal RAM in the Queue Manager, the Queue Manager will initially de-assert the qmgr_slv_rready signal. On the first cycle that a read is initiated to the queue region, the Queue Manager will proceed to load the queue head entry information into a set of mailboxes.

In order to populate the mailboxes with a 32-bit descriptor address, the queue manager resolves the descriptor index into a 32-bit descriptor pointer. When the 32-bit pointer is resolved and loaded into the mailbox register, the queue manager will assert the qmgr_slv_rready signal until the burst transfer is completed.

Just like the queue operations, the dequeuing operation must also be a burst access that starts on the address of Register A, B, C or D and ends at Register D. A burst access that ends with an address other than that of Register D will cause queue manager to exhibit unspecified behavior. The burst requirement ensures atomicity of the dequeue operations. If one entity is reading the queue registers A, B, C and D, no other entity will be able to start another read of the same set of registers. For CPUs that are not able to perform reads of more than 32 or 64 bits and need register A and register B information during dequeue operation, the queue accumulation function should be used.

The host can move the entire contents of one queue to another queue by writing the source queue number and the destination queue number to the Queue Diversion Register. When diverting packets, the host can choose whether the source queue contents should be pushed onto the tail (default) or head of the destination queue.

Whenever the queue manager successfully adds a descriptor in a queue that was previously empty, it updates a bit to indicate that the respective queue is not empty any more. This bit is also referred to as queue pending status bit. The queue pending status for each queue is readable via registers and for select queues, it may also be available as hardware output from queue manager. See queue allocation table for details.

The queue manager allows reading information about a queue without doing a pop operation. A separate memory region is assigned for this purpose. Any of the registers A, B and C can be read for any of the queues and specific information such as the number of entries, total number of bytes in a queue and the size of the packet at the head of a queue can be obtained. Note that these registers are only for reading and do not result in any queue operations. These registers are mapped on to a different address range from the registers that are accessed for Queue/Dequeue operations. This allows Queue Manager to detect that only queue status is to be provided and no actual queue operation is to be initiated.

The queue manager allows clearing a queue by queuing a null (Zero) pointer to the queue that needs to be cleared. When Zero value is written to register D during a push operation, the queue that is written to is emptied.

The queue manager provides an 8-bit counter for each free descriptor queue and each free descriptor/buffer queue. The starvation counter corresponding to a particular queue indicates the number of times an attempt to pop a free descriptor resulted in queue manager giving a zero pointer. The queue manager will provide a zero pointer if the corresponding free descriptor queue (or free descriptor/buffer queue) is empty. Note that queues with dedicated starvation counters are not limited to be used only as free queues. A queue with starvation counter can be used as any other queue as well and it will get starvation counter functionality.

In addition to the queue pending signals that are available on output ports as well as bit-mapped in the registers which provide an empty or non-empty status, the queue manager also provides a way to get information about whether or not the number of items in a queue is above or below a certain threshold number of items. This feature is also referred to as queue watermark status. The queue manager provides a 4-bit programmable threshold and a 1-bit comparison mode for each queue. These programmed values are applied to the queues for which threshold tracking is enabled at design time. The number of elements in a queue is compared at each push, pop and diversion to check if the size of the queue (or the number of items in the queue) and depending upon comparison mode, the threshold status bit for the corresponding queue is asserted to indicate the results of comparison. The comparison mode can be used to check if the queue size is greater than equal to or less than the programmed threshold. The threshold status for each queue is readable through a separate queue status slave interface.

Note that it is possible to provide the queue pending status information using the queue threshold feature. This can be done by setting the threshold to one and using greater than or equal to for the comparison mode. It is possible to configure a queue only for either queue pending (by setting threshold to 1 and threshold hi/lo bit to 1) or queue threshold type status information. By default, all queues are initialized to provide a queue pending status (i.e.) threshold value is 1 and threshold hi/lo bit is 1.

The event interface provides a hardware mechanism to monitor push and pop operations being performed on the queue manager. Every push operation with the exception of a null pointer push is reflected on this interface. Every pop operation with the exception of a pop operation on an empty queue is reflected on this interface. External entities can monitor this interface to track the queue operations and gather statistics.

An additional slave interface is available on the Queue Manager to enable a peek into the queue threshold status for any of the 8K queues. A read access on this slave interface accesses a 256×32 RAM. Each location in the RAM holds the status for 32 queues—offset 0×0 for queues 1-32, offset 0×4 for queues 33-64 and so on. The status bit for each queue reflects whether the number of entries in the queue is above or below the programmed threshold. This slave interface is a read-only VBUSP interface and provides an alternate way of reading the queue status without disrupting the bandwidth of the main Queue Manager slave interface.

There is an embedded memory in the Queue Manager. The depth of this memory is equal to the number of queues managed by the queue manager. The queue manager uses this RAM to record the value of head index, tail index, entry count and byte count for each queue. In addition, this RAM is also used to store the packet size (as written to Register C) and descriptor size (as written to Register D) for the head element of each queue. When a push/pop operation is performed, the queue manager updates the word corresponding to the queue number to reflect its new head/tail index, packet size and descriptor size. It also updates the value of byte count and entry count. For push operations that do not provide packet size, the queue manager assumes a packet size of zero.

For every push and pop operation, the queue manager also updates the linking RAM. The linking RAM is used to store packet size, desc_size and next index for a descriptor. There is a one to one relationship between the descriptor index and linking RAM offset. The information for descriptor 0 in region 0 is stored at linking RAM location with offset zero from the Linking RAM base address. The information for the last descriptor is stored at the last Linking RAM location.

What is claimed is:

1. A method of infrastructure messaging comprising the steps of:
    creating a message to be transmitted,
    creating a descriptor describing said message,
    attaching said message to said descriptor,
    storing messages in a linked list, each message including linking information to a location where a message attached to a next descriptor in an ordered queue is stored,
    pushing said descriptor onto an the ordered queue managed by a queue manager,
    popping said descriptor from the ordered queue, and
    making data transfers of messages attached to descriptors popped from the ordered queue.

2. The method infrastructure messaging of claim 1, wherein:
    said step of pushing a descriptor onto the ordered queue includes selectively pushing the descriptor onto one of said head of said ordered queue or said tail of said ordered queue.

3. The method infrastructure messaging of claim 1, wherein:
    said step of pushing a descriptor onto the ordered queue includes pushing the descriptor onto a head of the ordered queue if a head/tail control bit has a first digital state and pushing the descriptor onto a tail of the ordered queue if said head/tail control bit has a second digital state opposite to said first digital state.

4. The method infrastructure messaging of claim 3, further including the step of:
    writing to the head/tail control bit.

5. The method infrastructure messaging system of claim 1, further including the step of:
    generating an interrupt when a number of descriptors in the ordered queue exceeds a predetermined threshold.

6. The method infrastructure messaging of claim 1, further comprising the steps of:
    generating a first status on a bit of a slave interface if a number of descriptors stored in the ordered queue exceeds a programmable threshold; and
    generating a second status different than the first status on the bit of the slave interface if a number of descriptors stored in the ordered queue equals or is less than the programmable threshold.

7. The method infrastructure messaging system of claim 1, further comprising the step of:
    indicating whether the ordered queue stores at least one descriptor or is empty.

8. The method infrastructure messaging of claim 7, wherein:
    reading a predetermined register to read whether the ordered queue stores at least one descriptor or is empty.

9. The method infrastructure messaging of claim 1, further comprising the step of:
    pushing a predetermined null pointer to the ordered queue to clear all descriptors stored in the ordered queue.

10. The method infrastructure messaging of claim 1, wherein:
    said step of making data transfers employs a direct memory access controller.

11. The method infrastructure messaging system of claim 1, wherein:
    said steps of pushing a descriptor onto the ordered queue and popping a descriptor from the ordered queue employs a data processor; and
    said step of making data transfers employs a software task operating on a data processor.

12. The method infrastructure messaging system of claim 1, further comprising:
    said steps of pushing a descriptor onto the ordered queue and popping a descriptor from the ordered queue employs a first data processor; and said step of making data transfers employs a software task operating on a second data processor.

\* \* \* \* \*